United States Patent
Böhning et al.

(10) Patent No.: US 7,644,617 B2
(45) Date of Patent: Jan. 12, 2010

(54) DEVICE AND METHOD FOR ACOUSTIC SOURCE LOCALIZATION IN A SOUND MEASUREMENT TESTBED

(75) Inventors: Peer Böhning, Berlin (DE); Ulf Michel, Berlin (DE)

(73) Assignee: Deutsches Zentrum fur Luft und Raumfahrt Linder Hohe, Cologne (DE)

(*) Notice: Subject to any disclaimer, the term of this patent is extended or adjusted under 35 U.S.C. 154(b) by 308 days.

(21) Appl. No.: 11/548,721

(22) Filed: Oct. 12, 2006

(65) Prior Publication Data
US 2007/0199765 A1    Aug. 30, 2007

(30) Foreign Application Priority Data
Oct. 12, 2005   (DE)   ........... 10 2005 049 323

(51) Int. Cl.
  *G01N 29/00* (2006.01)
  *G01S 3/00* (2006.01)
(52) U.S. Cl. ............ 73/571; 73/586; 181/125
(58) Field of Classification Search ........... 73/571, 73/586, 583, 599; 181/125
See application file for complete search history.

(56) References Cited

U.S. PATENT DOCUMENTS

| | | | | |
|---|---|---|---|---|
| 4,459,851 A | * | 7/1984 | Crostack | 73/587 |
| 5,270,950 A | * | 12/1993 | Cowley et al. | 702/36 |
| 5,435,175 A | * | 7/1995 | Kramer et al. | 73/147 |
| 5,979,234 A | * | 11/1999 | Karlsen | 73/170.13 |
| 7,039,198 B2 | * | 5/2006 | Birchfield et al. | 381/92 |
| 2002/0059832 A1 | | 5/2002 | Lee | |
| 2005/0279168 A1 | * | 12/2005 | Bungenberg | 73/571 |
| 2006/0070445 A1 | * | 4/2006 | Juber et al. | 73/571 |

FOREIGN PATENT DOCUMENTS

| | | | |
|---|---|---|---|
| DE | 4237527 A1 | | 5/1994 |
| DE | 19524705 A1 | | 1/1997 |
| DE | 19910169 A1 | | 9/2000 |
| DE | 19910329 A1 | | 9/2000 |
| DE | 10304215 A1 | | 8/2004 |
| DE | 10123545 | * | 9/2009 |
| JP | 02001142471 A | * | 5/2001 |

OTHER PUBLICATIONS

Von Georg Pfeiffer et al., Moderne Pruftechnik in der BMW Antriebsentwicklung-Drei neue Spezialprufstande, ATZ Automoviltechnische Zeitschrift 99 (1997).
Von Karl Hofer et al, Die Akustik des neuen V6-TDI-Motors im Audi A8, ATZ Automobiltechnische Zeitschrift 99 (1997).

* cited by examiner

Primary Examiner—Hezron Williams
Assistant Examiner—J M Saint Surin
(74) Attorney, Agent, or Firm—Sherr & Vaughn, PLLC

(57) ABSTRACT

An enclosed test stand may be enclosed by at least two reverberant boundary surfaces. Two of said at least two reverberant boundary surfaces may abut against each other to form an edge. A first linear array of microphones may be configured to detect acoustical signals of a sound field. The linear array of microphones may be arranged along the edge. An evaluating unit may be coupled to the linear array of microphones. The evaluating unit may be configured to locate sound sources of the sound field.

18 Claims, 2 Drawing Sheets

DEVICE AND METHOD FOR ACOUSTIC SOURCE LOCALIZATION IN A SOUND MEASUREMENT TESTBED

The present application claims priority under 35 U.S.C. 119 and 35 U.S.C. 365 to German Patent Application No. 102005049323.8-52 (filed on Oct. 12, 2005), which is hereby incorporated by reference in its entirety.

BACKGROUND

Generally, noise emissions are a kind of environmental stress. In a mobile society, in which the quantity of air traffic rises continuously, the stresses caused by aircraft noise constitute a particularly significant problem, since this affects a large number of people located near airports. For many years, the limit values for the emissions of aircrafts have been tightened and thus have resulted in a clear reduction of the noise exposures in the environment of airports. During take off and touch down, however, aircraft engines are the loudest sound source of an aircraft. In order to reach further reductions of the sound emissions of an aircraft engine it may be beneficial to locate the point of origin of the sound of the engine as precisely as possible.

The points at which acoustic signals are generated and/or leave an object are referred to as sound sources. Besides a simulation of the sound generation it is further necessary to measure the aircraft engines in order to control an influence of measures for the suppression of sound emissions. For this purpose, an aircraft engine is placed as a test specimen in a test stand for sound measurement. At the test stand for sound measurement, several microphones are arranged at a distance from one another, which detect the acoustic measurement signals of a sound field produced by the different sound sources of the test specimen. An evaluating device analyzes the acoustic measurement signals, which is able to locate the individual sound sources by means of the known positions at which the microphones are arranged. By these measures, for example, the sound influence of the inlet, the main nozzle and the secondary nozzle as well as the jet in the case of a jet engine may be separated and analyzed.

Outdoor test stands for sound measurement are known which, however, due to the heavy sound emissions are only erected and operated in secluded areas. This results in high transportation costs for the test specimens and the technical equipment for the measurements. Furthermore, measurements highly depend on weather conditions. As such it is often impossible to carry out a measuring plan due to heavy rain or wind.

It is further known to carry out measurements in enclosed test stands for sound measurement, which are provided with low reflection boundary surfaces. The production of these low reflection rooms is very expensive. For this reason, measurements are made increasingly also in test stands for sound measurement which are constructed like a hall and have sufficient noise insulation and which are normally located on the factory premises of the sites of engine production or development. These test stands for sound measurement comprise boundary surfaces, which are at least partially reverberant so that directed reflections of the sound will occur there. Acoustic signals reflected due to these reflections may be considered as acoustic signals of coherent image sound sources.

The reflections occurring at the reverberant boundary surfaces were normally not considered at all in known evaluation processes. In the case of outdoor test stands, however, it is known that in the case of an arrangement of the microphones on the floor the influences of the single image sound source, which is associated with the floor, may easily be taken into account. In the case of an arrangement of the microphones on the floor, the distances between the sound source and the microphone and between the image sound source and the microphone are equal. Due to interference between the acoustic pressure field of the source and the acoustic pressure field associated with the image sound source, a duplication of the acoustic pressure at the microphone (floor) will occur but no frequency-dependent phase shift. Thus it is possible to compensate the reflections mathematically in that the acoustic pressure is divided by a factor two. In the state of the art an evaluation process for wind tunnels is known in which by means of very extensive calculations the image sound sources are included.

SUMMARY

Embodiments relates to a device for locating sound sources in a test stand for sound measurement. Embodiments relate to the technical problem to provide a device and a method for locating sound sources of a test specimen, in particular an aircraft engine, in a more simple and exact manner in an at least partially enclosed test stand for sound measurement.

For this purpose, a test specimen, for example a jet engine, is positioned in a measuring volume of an enclosed test stand for sound measurement. When idealized, a jet engine may be considered as a linear source. The measuring volume is limited either by the walls of the test stand for sound measurement or by objects introduced into the test stand for sound measurement. The surfaces of the objects and/or walls limiting the measuring volume are referred to as boundary surface. Microphones for detecting acoustic measurement signals are arranged in the test stand for sound measurement spaced apart from one another. The acoustic measurement signals of the microphones are evaluated by an evaluating unit for locating the sound sources of the test specimen.

According to embodiments, microphones are arranged as a linear array along an edge at which two boundary surfaces, which have a plane shape, adjoin each other. It may be possible in a simple and accurate manner to take into account the reflections of the sound field at two boundary surfaces. If, for example, a floor of the test stand for sound measurement and a side wall are smooth enough, the microphones may be positioned as a linear array along that edge at which the side wall adjoins the floor. The alignment of the test specimen is made during the positioning in such a manner that the test specimen, for the case that an aircraft engine is concerned, is aligned in parallel to the edge along which the microphones are arranged.

When the two boundary surfaces of the measuring volume extend at a right angle relative to one another, the acoustic pressure measured by the microphones may be corrected as regards interferences due to reflections at the boundary surfaces in that the measured acoustic pressure is divided by four. The reflections at both boundary surfaces have in particular the effect, due to the interference of the two coherent acoustic pressure fields associated with the image sound sources and the acoustic pressure field of the test specimen, that the acoustic pressure is quadruplicated. Frequency-dependent phase shifts will not occur. The detection of the sound may also include the determination of the spectrums of the emitted acoustic signals.

As a matter of principal, the acoustic signal portions of the acoustic field, which are reflected at boundary surfaces arranged opposite to the boundary surfaces forming the edge at which the linear array of microphones is positioned, are attenuated. The reason for this is that the distance covered by these acoustic signal portions is greater than a direct sound path from the test specimen to the microphones. A still larger reduction of these reflected signal portions is obtained in embodiments in which boundary surfaces arranged opposite to the at least two boundary surfaces have a sound absorbent configuration. If the opposite boundary surfaces are sound absorbent, a calculative consideration of reflections at these opposite boundary surfaces may normally be omitted completely.

In embodiments, it is provided for that one or both of the at least two boundary surfaces are integrally formed with the test stand for sound measurement. In this case, an edge formed with a side wall at the floor or at a ceiling of the test stand for sound measurement may be used for positioning the linear array.

For the case that the side walls, the floor and/or the ceiling are not smooth enough because they include, for example, doors, recesses for lamps and the like, it is advantageous to install one or two boundary surfaces in the test stand for sound measurement which then form the edge along which the microphones are arranged as a linear array. The boundary surfaces installed are chosen and arranged such that the reflections from further boundary surfaces of the measuring volume aligned substantially parallel thereto and arranged behind them are also considered. A boundary surface lies in this sense behind one of the installed boundary surfaces, if a surface of one of the installed boundary surfaces with a virtually unlimited extension would insulate the boundary surface from acoustic signals of the test specimen.

If, for example, an elongated angular section is installed on the floor of the test stand for sound measurement so as to extend parallel to a side wall, by taking into account the reflections at the angular section in the manner mentioned above also the reflections both at the floor and at the side walls are taken care off.

In order to obtain still more complete measuring information, a development of the invention provides for that further microphones are arranged in an additional linear array along a further edge, which is parallel to the edge formed by the boundary surfaces.

A still more complete acoustic signal information will be achieved with a development in which additional microphones in an additional linear array are provided for detecting additional sound measuring signals, the additional linear array being arranged at an angle relative to the linear array. When evaluating the measuring signals of the additional microphones, however, reflections at the boundary surfaces of the measuring volume must be taken into account.

In order to achieve a complete elimination of the acoustic signal portions caused by reflections at the boundary surfaces positioned opposite to the at least two boundary surfaces, embodiments provide for that the sound measuring signals may be detected in intervals, a length of time of an interval being smaller than a transmit time an acoustic signal originating from one of the sound sources and being reflected at the boundary surfaces positioned opposite to the at least two boundary surfaces needs for travelling to one of the microphones of the linear array. By these means a separation of the reflected sound portions may be achieved by a temporal separation. This separation is also possible in the case that the boundary surfaces positioned opposite to the at least two boundary surfaces do not have a sound absorbent construction.

BRIEF DESCRIPTION OF THE DRAWINGS

Example

Example

Example

Example

DETAILED DESCRIPTION

Figure 1:
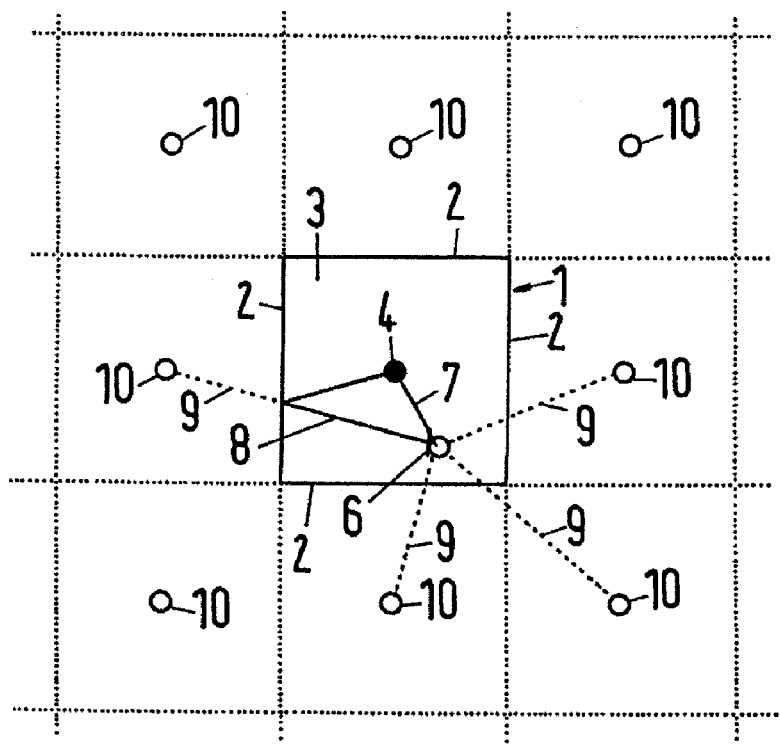
FIG. 1 is a schematic cross-sectional view of a test stand for sound measurement for explaining the consideration of reflected acoustic signals by means of coherent image sound sources, in accordance with embodiments.

Example FIG. 1 shows schematically a cross-section of a test stand for sound measurement 1, in accordance with embodiments. A measuring volume 3 is limited by boundary surfaces 2 being formed as side walls of the test stand for sound measurement 1. In the center of the measuring volume 3 there is arranged a test specimen 4 extending perpendicular to the drawing plane which is, for example, a jet engine for propelling an aircraft. A sound field is produced by the test specimen. Microphones 6 are arranged in the test stand for sound measurement 1. The sound field comprises direct acoustic signals 7 which spread from the test specimen in a straight line to the microphones 6 and reflected acoustic signals 8 which are reflected at least once at least one of the boundary surfaces 2 before reaching the microphones 6. It is assumed that the boundary surfaces 2 are at least partially reverberant so that they reflect the reflected acoustic signals 8 in a directed manner.

By means of the microphones 6 the acoustic measuring signals of the sound field are detected. The acoustic measuring signals are in this connection the detected measuring signals resulting from a superposition of the direct acoustic signals 7 and the reflected acoustic signals 8. The reflected acoustic signals 8 may be considered as virtual direct acoustic signals 9 of virtual coherent image sound sources 10 when evaluating the acoustic measuring signals.

Figure 2:
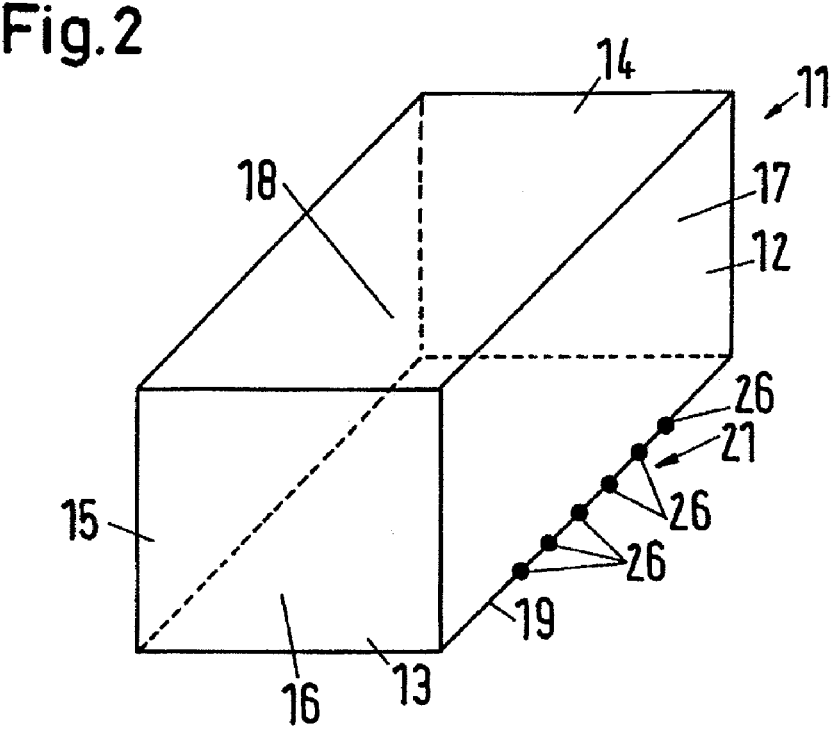
FIG. 2 is a schematic view of a test stand for sound measurement, in which microphones for detecting acoustic measurement signals are arranged along an edge of the test stand for sound measurement, in accordance with embodiments.

Example FIG. 2 shows a test stand for sound measurement 11, in accordance with embodiments. The test stand for sound measurement 11 comprises a side wall 12, a floor 13, a ceiling 14, a further side wall 15 arranged opposite to the side wall 12, a front wall 16 and a back wall 17 arranged opposite to the front wall 16 which are in each case boundary surfaces of a measuring volume 18. Each of the boundary surfaces is formed reverberant and smooth, the front wall comprising an inlet and the back wall comprising an outlet through which fluids may flow during the operation of a test specimen formed as a jet engine. This means that air will enter through the inlet and the exhaust gas jet of the test specimen will substantially escape at the outlet. The test stand for sound measurement is at large constructed such that limit values for sound emissions are not exceeded outside of the test stand for sound measurement 11.

The floor 13 and the side wall 12 abut against each other along an edge 19. Along and in this edge 19 there are arranged microphones 26 as a linear array 21, in order to locate different sound sources of the test specimen and to separate the acoustic signals emerging from said sound sources. The locating is made by means of an evaluating unit, which processes the acoustic measuring signals under consideration of the known positions of the microphones 26.

Figure 3:
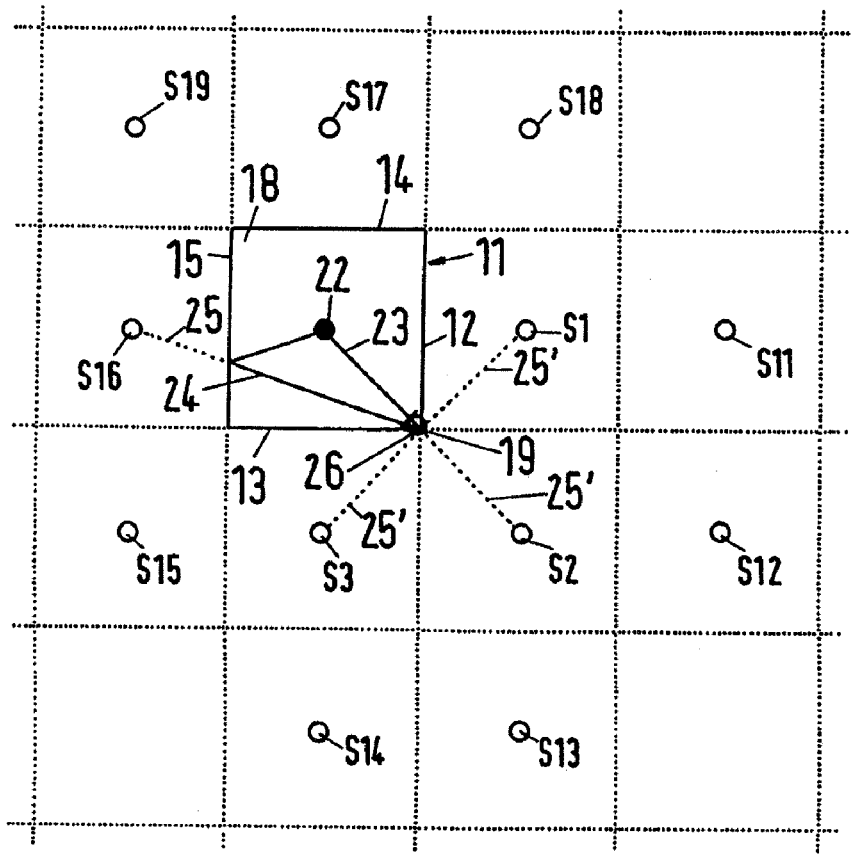
FIG. 3 is a schematic view of a further cross-section of a further test stand for sound measurement for explaining the influence of reflected acoustic signals on microphones arranged along an edge of the test stand for sound measurement, in accordance with embodiments.

Example FIG. 3 illustrates advantages achieved with an evaluation of the acoustic measuring signals which have been recorded with the microphone arrangement formed as a linear array 21 of FIG. 2, in accordance with embodiments. Identical features are designated by identical reference numerals in FIGS. 2 and 3. In FIG. 3 there is shown a sectional view of the test stand for sound measurement 11 according to FIG. 2 taken perpendicularly to the sidewall 12, the floor 13, the ceiling 14 and the further side wall 15 arranged opposite to the side wall 12, which form the boundary surfaces of the measuring volume 18. In a center of the measuring volume 18 the test specimen 22 is shown as a dot. The test specimen 22 extends perpendicularly to the drawing plane parallel to the side wall 12, the floor 13, the ceiling 14 and the further side wall 15.

In the edge 19 formed by the floor 13 and the side wall 12 abutting against it, the microphones 26 are arranged. The sound field detected by the microphones 26 comprises direct acoustic signals 23 which spread from the test specimen 22 in a straight line directly to the microphones 26 and reflected acoustic signals 24 which are reflected by at least one of the boundary surfaces of the measuring volume 18. These reflected acoustic signals may be considered and treated as so-called virtual direct acoustic signals 25 of virtual image sound sources S1-S3, S11-S20 which is coherent to the sound sources of the test specimen.

If the sound field of an engine is considered to be a rotationally symmetrical sound field, originating from sound sources which are all located on a central axis of the engine, then each reflection at one of the smooth boundary surfaces is associated with one of the image sound sources S1-S3, S11-S20. The virtual image sound source S16 which sends virtual direct acoustic signals 25 is associated with the acoustic signals 24 reflected at the further side wall 15 arranged opposite to the side wall 12. The image sound source S1 is associated with a reflection at the side wall 12 and the image sound source S3 is associated with a reflection at the floor 13 and the image sound source S17 is associated with a simple reflection at the ceiling 14.

The image sound source S2 is associated with a double reflection at the side wall 12 and the floor 13 or a reflection at the edge 19, respectively. In an analogous manner, the sound source S15 is associated with two reflections, namely at the floor 13 and the further side wall 15, the image sound source S19 is associated with reflections at the further side wall 15 and the ceiling 14, the image sound source S18 is associated with acoustic signals double-reflected at the ceiling 14 and the side wall 12. Corresponding thereto, the virtual image sound sources S11, S12, S14 and S13 are associated in each case with double-reflected or triple-reflected acoustic signals, respectively.

The transmit times of the direct acoustic signals 23 and of the virtual direct acoustic signals 25' associated with the image sound sources S1, S2, S3 to the microphones 26 are equal and an interference of these direct acoustic signals 23 and virtual direct acoustic signals 25' results in the case of an angle of 90° between the floor 13 and the side wall 12 in a quadruplicating of the acoustic pressure level at the microphones 26 arranged in the edge 19. A division by four may thus take into account the reflections at the side wall 12 and the bottom 13.

Since the transmit times of the reflected acoustic signals 24 from the test specimen 22 to the microphones 26 are larger than those of the direct acoustic signals 23, the direct acoustic signals 23 and the reflected signals 24 may be separated, if the acoustic measuring signals detected by the microphones are evaluated in intervals, the length of an interval being shorter than a difference of the signal transmit times between the direct acoustic signals 23 and the (simply) reflected acoustic signals 24. By these means, a temporal separation of the portions of the acoustic pressure level which are attributed to the direct acoustic signals 23 and the reflected acoustic signals 24 becomes possible. The same is valid for other reflected acoustic signals which are represented by means of the further virtual image sound sources S11-S20. Additionally, the acoustic pressure of a reflected acoustic signal decreases together with the distance of the respective image sound source S11-S19 to the corresponding microphone 26. Acoustic signal portions assigned to image sound sources, which are associated with multiple reflected acoustic signals, may thus normally be disregarded.

Figure 4:
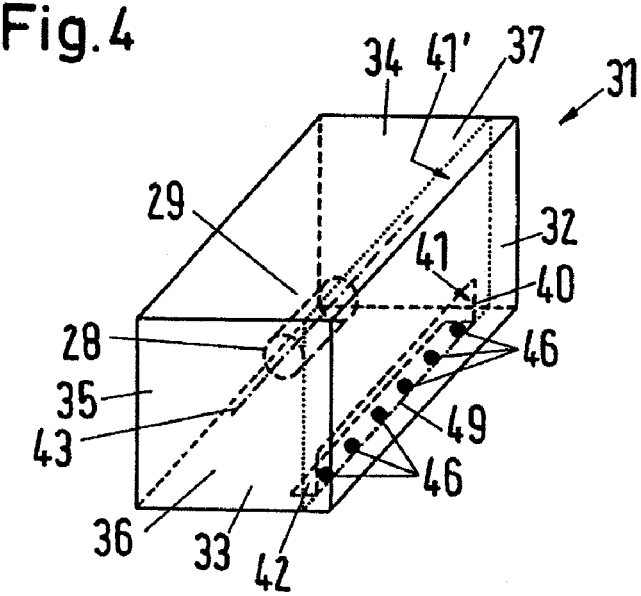
FIG. 4 is a schematic view of another test stand for sound measurement, in which boundary surfaces of a measuring volume have been installed forming an edge along which microphones for detecting acoustic measurement signals are arranged, in accordance with embodiments.

Example FIG. 4 shows illustrates a test stand for sound measurement 31, which is constructed like a hall, in accordance with embodiments. The test stand includes a side wall 32, a floor 33, a ceiling 34, a further side wall 35 arranged opposite to the side wall 32 as well as a front wall 36 and a back wall 37. A test specimen 28 constructed as a jet engine is aligned with an axis 43 extending parallel to the side wall 32, the floor 33, the ceiling 34 und the further side wall 35.

A measuring volume 29 is to some extent limited by an object 40. The object 40 is shaped as an angular section and comprises a first smooth surface 41 aligned parallel to the side wall 32 and a second surface 42 arranged on the floor 33 parallel to the latter. In and along an edge 49, at which the first surface 41 abuts against the second surface 42, microphones 46 are arranged which are connected to an evaluating unit not shown in the drawings. Such an arrangement will be preferred if, for example, the side wall 32 and/or the floor 33 of the test stand for sound measurement 31 is not smooth enough. The first surface 41 has been chosen such that acoustic signals reflected at the side wall 32 cannot reach the microphones 46. This is the case, if a virtual surface 41', which is obtained by a virtual enlargement of the surface 41, insulates the side wall 32 from acoustic signals coming from the test specimen 28. It should be appreciated that the first surface 42 must have dimensions, which exceed the dimensions of the microphones 46 and have at least the magnitude of the longest examined wavelength of the acoustic signals. The object 40 may be used in embodiments in order to simply take into account interferences of the measured acoustic measuring signals caused by reflected signal portions at the side wall 32 and at the floor 33, in the manner mentioned above by carrying out a division by four.

Persons skilled in the art are familiar with calculation methods for determining sound sources of the test specimen 28 by means of the acoustic measurement signals of the microphones 46.

In embodiments it may be provided for that further microphones are arranged at a further edge at which boundary surfaces of the measuring volume abut against each other. These further microphones form a further linear array, which is parallel to the linear array of microphones arranged in the edge. For example, in embodiments similar to embodiments illustrated in FIG. 2, it may be provided for that the further microphones are arranged along and in the edge, which is formed by the ceiling 14 and the side wall 12.

Embodiment may include additional or alternatively additional microphones in the form of an additional array, which are arranged at an angle to the array of microphones arranged in the edge. The additional array may, for example, be arranged on the floor 13 perpendicular to the edge 19. When evaluating the acoustic measuring signals of the additional microphones, reflections at the boundary surfaces of the measuring volume have to be taken into account.

The foregoing embodiments and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising:
   an enclosed test stand comprising a measuring volume enclosed by at least two reverberant boundary surfaces, wherein two of said at least two reverberant boundary surfaces abut against each other to form a first edge;
   a first linear array of microphones configured to detect acoustical signals of a sound field, wherein said first linear array of microphones are arranged in the measuring volume along the first edge; and
   an evaluating unit coupled to said first linear array of microphones, wherein the evaluating unit is configured to locate sound sources of the sound field.

2. The apparatus of claim 1, wherein said at least two reverberant boundary surfaces are arranged opposite to at least two absorbent boundary surfaces.

3. The apparatus of claim 1, wherein at least one of the at least two reverberant boundary surfaces are integrated into the test stand.

4. The apparatus of claim 1, comprising a second linear array of microphones.

5. The apparatus of claim 4, wherein said first linear array of microphones is parallel to said second linear any of microphones.

6. The apparatus of claim 4, wherein said second linear any of microphones is arranged at an angle to said first linear any of microphones.

7. The apparatus of claim 4, wherein:
   two of said at least two reverberant boundary surfaces abut against each other to form a second edge; and
   said second linear any of microphones is arranged along the second edge.

8. The apparatus of claim 4, wherein said second linear any of microphones are configured to detect acoustical signals of the sound field.

9. The apparatus of claim 1, wherein the acoustical signals are detected in intervals, wherein:
   the length of time of each interval is smaller than a transit time of a reflected acoustic signal;
   the reflected acoustic signal originates from the sound sources and is reflected off of at least one of said at least two reverberant boundary surfaces prior to reaching said first linear any of microphones; and
   said at least one of said at least two reverberant boundary surfaces is not a surface that forms the first edge.

10. A method comprising:
    detecting acoustic signals of a sound field in an enclosed test stand at a first linear array of microphones, wherein the enclosed test stand comprising a measuring volume enclosed by at least two reverberant boundary surfaces, wherein two of said at least two reverberant boundary surfaces abut against each other to form a first edge, and wherein said first linear array of microphones are arranged in the measuring volume along the first edge;
    evaluating the acoustic signals at an evaluating unit; and
    locating a sound sources of the sound field.

11. The method of claim 10, wherein said at least two reverberant boundary surfaces are arranged opposite to at least two absorbent boundary surfaces.

12. The method of claim 10, wherein at least one of the at least two reverberant boundary surfaces are integrated into the test stand.

13. The method of claim 10, wherein the test stand comprises a second linear array of microphones.

14. The method of claim 13, wherein said first linear array of microphones is parallel to said second linear array of microphones.

15. The method of claim 13, wherein said second linear array of microphones is arranged at an angle to said first linear array of microphones.

16. The method of claim 13, wherein:
    two of said at least two reverberant boundary surfaces abut against each other to form a second edge; and
    said second linear array of microphones is arranged along the second edge.

17. The method of claim 13, wherein said second linear array of microphones are configured to detect acoustical signals of the sound field.

18. The method of claim 10, wherein said detecting acoustic signals comprises detecting the acoustical signals in intervals, wherein:
    the length of time of each interval is smaller than a transit time of a reflected acoustic signal;
    the reflected acoustic signal originates from the sound sources and is reflected off of at least one of said at least two reverberant boundary surfaces prior to reaching said first linear array of microphones; and
    said at least one of said at least two reverberant boundary surfaces is not a surface that forms the first edge.

* * * * *